Patented May 12, 1953

2,638,480

UNITED STATES PATENT OFFICE 2,638,480

PROCESS OF PREPARING ARYLAMINO-METHYLENEMALONATES

Samuel A. Glickman, Easton, Pa., assignor to General Aniline & Film Corporation, New York, N. Y., a corporation of Delaware No Drawing. Application December 31, 1951,
Serial No. 264,352

5 Claims. (Cl. 260—471)

This invention relates to an improved process of preparing arylaminomethylenemalonates.

It is known that arylaminomethylenemalonates undergo thermal cyclization to yield the corresponding nuclear substituted 4-hydroxyquinolines which are converted to the 4-chloroquinolines followed by treatment with various amines to yield commercially important antimalarial drugs, i. e., "Chloroquine" and "Camoquin."

Heretofore, the synthesis of the arylaminomethylenemalonates has not lent itself to any one general method and depended for its success on (1) the ability to secure the necessary intermediates from the activated ester, or (2) the ability to avoid side reactions which very often complicated operations and led to impurities.

The arylaminomethylenemalonates under consideration are characterized by the following formulae:

(1) 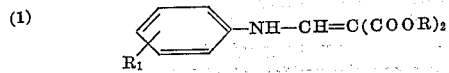

⇅

(2) 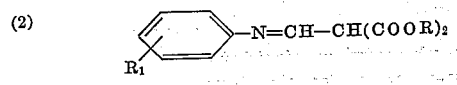

wherein R represents a lower alkyl group, e. g., methyl, ethyl, propyl, isopropyl, butyl, isobutyl, and the like, and $R_1$ represents a nuclear substituent, such as an alkyl of the same value as R, alkylamino, an alkoxy, e. g., methoxy, ethoxy, propoxy, butoxy, etc., or a halogen, such as chlorine, bromine, or iodine. It is to be noted that the compound designated (1) is also depicted as being in tautomeric equilibrium with the corresponding anil (2) as shown. Both types of compounds, i. e., (1) and (2) undergo the thermal cyclization referred to above.

The literature (Annalen 297, 77 [1897]; JACS 68, 1204 [1946]; and Organic Syntheses, vol. 28, 38–41 [1948]) reports the synthesis of compounds of the type (1) or (2) by the reaction of aromatic amines with ethoxymethylenemalonic ester, according to the following equation:

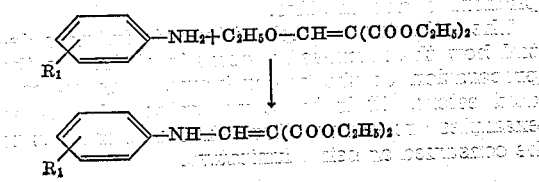

wherein $R_1$ has the same value as above.

The use of the above reaction for large scale operations is attendant with various difficulties, one of which is the limited availability of the ethoxymethylenemalonic ester. The synthesis of the latter compound proceeds at best in 50–60% yields based on malonic ester and 44–53% yields based on ethyl orthoformate (Organic Syntheses, vol. 28, 38–41 [1948]). The reaction times and conditions are critical and wide fluctuations in yield have been noted, especially in manufacturing scale operations. Furthermore, the use of ethyl ethoxymethylenemalonate is also objectionable for the additional reason that its pronounced skin-irritant action necessitates extreme handling care to prevent injury to operating personnel. It has also been reported that the ethoxymethylenemalonate should be of a high degree of purity and that use of impure ester led to deep decoloration and low yields on cyclization steps.

The Dains formamidine synthesis (Dains, Ber. 35, 2496 [1902]; Dains and Brown, JACS 31, 1148 [1909]) is given by the following equation in which diarylformamidines (3) are reacted with cyanomethylene compounds.

(3) 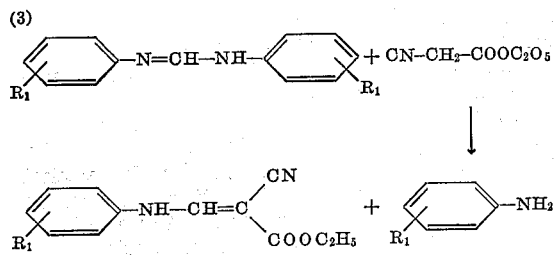

The usefulness of the above reaction is limited to cyanomethylene compounds because of the secondary aminolysis of the reaction products by the liberated amine to give anilides, such as (4) according to the following equation:

(4) 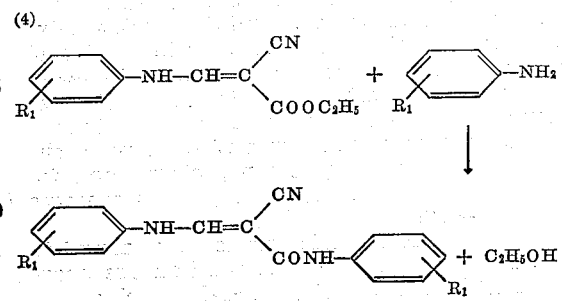

The completeness of the secondary reaction is conditioned largely by the temperature and the nature of the reacting derivative. Thus, with malonic ester the amide formation is practically complete, with acetoacetic ester 50–80% of the amine reacts with the carbethoxy group, while the cyanoacetic ester no amide formation occurs (Dains and Brown, JACS 31, 1148 [1909]).

Several investigators have used the Dains reaction to synthesize arylaminomethylenemalonates of the type (1) under carefully controlled experimental conditions even to the point of interrupting the reaction at about 40% conversion (Price and Roberts, JACS 68, 1255 [1946]; Roberts J. Org. Chem. 14, 277 (1949); Fisher, USP 2,494,801 [1/17/50]). The complications due to the release of the arylamine and the formation of anilides of the class (4) is magnified considerably by the problems of recovering and removing the starting materials.

Snyder and Jones (JACS 68, 1253 [1946]; USP 2,504,895) have modified the Dains synthesis by preparing the diarylformamidines (3) from ethyl orthoformate and the arylamine in the presence of the active methylene compound thereby accomplishing a direct synthesis. However, as in the Dains reaction, the method was most successful with cyanoacetic ester. The reaction with malonic ester occurred readily, but the product was not the expected dicarboxylic ester $$[m\text{-}ClC_6H_4NHCH=C(COOC_2H_5)_2]$$

but rather the corresponding mono-m-chloroanilide.

Inasmuch as α-substituted-β-arylaminoacrylates of the class of (1) and (2) are valuable intermediates in the preparation of the nuclear substituted 4-hydroxyquinolines, it is the object of the present invention to provide an improved process of preparing said compounds while avoiding the objectionable features and difficulties noted above.

Other objects and advantages will become apparent from the following description.

In carrying out the improved process a molecular equivalent of an N-arylformamidic acid ester and a molecular equivalent, in slight excess, of a lower dialkyl malonate, in the presence of a catalytic amount of an inorganic or organic base material under substantially anhydrous conditions, is heated either to reflux or at a temperature ranging from 90–140° C. for several hours, until condensation is completed. This usually takes from 20 to 35 hours. The lower alkyl alcohol liberated during the condensation reaction as well as the nature of the coreactants and basic catalyst often determine the final condensation reaction temperature. Despite the initial temperature employed, it will fall repeatedly as the lower alcohol is formed in the reaction vessel and will finally reach a definite steady temperature which may range from 80–110° C. The basic catalyst is neutralized with any acid, preferably with 3 molar hydrochloric acid and the reaction mixture steam distilled to remove the lower alcohol and excess malonic ester and unreacted N-arylformamidic acid esters. The final product is recovered by either crystallization from ethanol, aqueous methanol, petroleum ether, or by solvent extraction with ether, benzene, toluene, and the like. The yield of the final product averages about 85–88%.

The N-arylformimidic acid esters employed in the foregoing condensation reaction are characterized by the following general formula:

The usefulness of the above reaction is limited

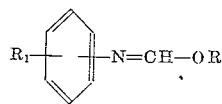

wherein R represents a lower alkyl, i. e., methyl, ethyl, propyl, isopropyl, butyl, isobutyl, etc., and $R_1$ represents a halogen, e. g., chlorine, bromine, iodine, a lower alkyl of the same value as R, alkylamino, e. g., $CH_3NH-$, $C_2H_5NH-$, $C_3H_7NH-$, $C_4H_9NH-$, etc. alkoxy, e. g., methoxy, ethoxy, propoxy, isopropoxy, butoxy, isobutoxy, and the like.

Such acid esters are readily prepared in good yields by following the procedure of Roberts (JACS 71, 3848 [1949]) which involves the acid catalyzed reaction of arylamines and diarylformamidines with ethyl orthoformate or equivalent lower alkyl orthoformate. N-m-chlorophenylformamidic acid esters and the process of preparing the same are disclosed in my application Serial No. 264,351, filed on even date, to which reference is made as to the types of esters which may be employed in the process of the present invention.

As examples of suitable arylamines, which may be employed in the preparation of the aforestated N-arylformamidic acid esters, the following may be mentioned:

*Arylamines*

Aniline
o-, p-, and m-Chloroaniline
p-Toluidine
m-Cumidine
p-Methoxyaniline
o-, m-, and p-Phenetidine

*N-arylformamidate*

Ethyl N-phenylformimidate
Ethyl N-o-chlorophenylformimidate
Ethyl N-m-chlorophenylformimidate
Ethyl N-p-chlorophenylformimidate
Ethyl N-p-tolylformimidate
Ethyl N-m-cumylformimidate
Methyl N-p-methoxyphenylformimidate
Ethyl N-o-phenetylformimidate
Ethyl N-m-phenetylformimidate
Ethyl N-p-phenetylformimidate The lower dialkyl malonates, which are condensed with an N-arylformimidic acid ester, may be those, such as, for example, dimethyl, diethyl, dipropyl, diisopropyl, dibutyl malonates, and the like.

The base catalyst which may be employed in the condensation reaction is any one of the usual inorganic or organic base materials, such as sodium and potassium salts of aliphatic acids, i. e., formic, acetic, propionic, butyric, etc., sodium and potassium alkoxides, e. g., sodium or potassium methylate or ethylate, etc., sodium or potassium carbonate, organic amine bases, trimethylamine, triethylamine, pyridine, methylpyridine, ethylpyridine, piperidine, quinoline, benzyltrimethyl ammonium hydroxide, sodium or potassium phenolates, e. g., sodium or potassium phenoxide, and the like.

The following examples illustrate in more detail how the improved process is utilized in the preparation of the arylaminomethylenemalonic acid esters. It is to be understood that these examples are merely illustrative and are not to be construed as being limitative.

EXAMPLE I

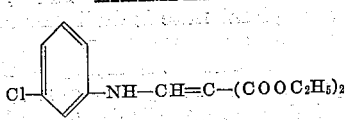

Ethyl α-carbethoxy-β-m-chloroanilinoacrylate

A mixture of 44 grams of diethyl malonate, 46 grams of ethyl N-m-chlorophenylformimidate (boiling point of 95° C. at 3.5 mm., $n_D^{25}$ 1.5399, $d_4^{25}$ 1.134) and 1 ml. of piperidine was heated for 24 hours. The initial temperature employed was 130° C. and fell repeatedly as alcohol was formed in the reaction to reach a final temperature of 102° C. The contents were subjected to steam distillation to remove the excess malonic ester. The product was extracted with benzene, dried, and concentrated. The yield of ethyl α-carbethoxy-β-m-chloroanilinoacrylate was 65 grams or 87%. A small portion was recrystallized from low boiling petroleum ether and gave a melting point of 55-56° C. which is identical with the melting point and mixed melting point with a sample prepared by the method of Price and Roberts (JACS 68, 1204 [1946]).

EXAMPLE II

A mixture of 176 grams of diethyl malonate, 184 grams of ethyl N-m-chlorophenylformimidate and 2.7 grams of sodium methylate was heated at 93–96° C. for 24 hours. The contents were neutralized to litmus with dilute hydrochloric acid and subjected to steam distillation. The product was taken up in benzene, dried, and concentrated. The weight of ethyl α-carbethoxy-β-m-chloroanilinoacrylate was 286 grams or 96%.

EXAMPLE III

A mixture of 88 grams of diethyl malonate, 92 grams of ethyl N-m-chlorophenylformimidate, and 4.7 grams of anhydrous potassium acetate was heated under reflux at 95–105° C. for 30 hours. The solution was treated with 15 ml. of 3 molar hydrochloric acid and subjected to steam distillation to remove excess reactants. The organic material was taken up in benzene, dried, and concentrated. The yield of ethyl α-carbethoxy-β-m-chloroanilinoacrylate was 129 grams or 86%.

EXAMPLE IV

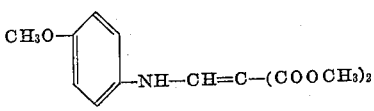

A mixture of 145 grams of dimethyl malonate, 165 grams of methyl N-p-anisylformimidate and 2.7 grams of sodium methylate was heated at 90–95° C. for 24 hours. The contents were neutralized to litmus with dilute hydrochloric acid and then subjected to steam distillation. The product was taken up in benzene, dried, and concentrated. The weight of methyl α-carbomethoxy-β-(p-methoxyanilino)-acrylate obtained was 252 grams or 95%.

EXAMPLE V

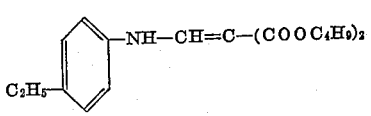

A mixture of 238 grams of dibutyl malonate, 177 grams of ethyl N-p-ethylphenylformimidate, and 4.7 grams of anhydrous potassium acetate was heated under reflux at 95–105° C. for 30 hours. The solution was neutralized and steam distilled to remove excess reactants. The butyl α-carbobutoxy-β-(p-ethylanilino)-acrylate was taken up in toluene, dried, and concentrated. The yield was 85%.

EXAMPLE VI

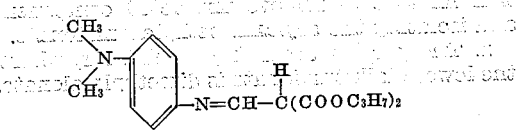

The procedure of Example I was followed except that 52 grams of di-n-propyl malonate was used in place of the diethyl malonate and that 48 grams of ethyl N-p-dimethylaminophenylformimidate was used in place of ethyl N-m-chlorophenylformimidate. The yield of propyl α-carbopropoxy-β-(p-dimethylanilino)-acrylate obtained was 82%.

EXAMPLE VII

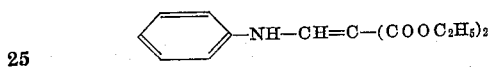

The procedure of Example II was followed with the exception that 149 grams of ethyl N-m-phenylformimidate was used in place of 184 grams of N-m-chlorophenylformimidate. A yield of 94% of ethyl α-carbethoxy-β-anilinoacrylate was obtained.

From the foregoing examples, it is readily apparent that the process steps of the present invention provide an improved method of preparing arylaminoethylenemalonates. The method avoids the difficulties of the poor and erratic synthesis and troublesome handling of ethoxymethylenemalonic ester. The intermediates, N-arylformimidic acid esters, are readily prepared and handled. Another significant feature of the process is that the presence of free amines is completely avoided and the possibility for anilide formation by completing secondary reactions is completely avoided. This overcomes a serious drawback to practically all of the arylaminoacrylate syntheses which suffer from contamination of such anilides. It is also to be noted that the inexpensive and commercially available lower dialkylmalonates is the reagent employed in excess and not the expensive and unavailable ethoxymethylenemalonic ester of the Price synthesis. Moreover, the employment of a basic catalyst contributes to the excellent yields obtained. The function of the basic catalyst is to promote the formation of an enolate anion from the malonic ester.

While I have disclosed the preferred embodiments of my invention, it will be readily appreciated by those skilled in the art that many changes and variations may be made therein without departing from the spirit thereof. The scope of the invention is to be limited solely by the appended claims.

I claim:

1. The process of preparing arylaminomethylenemalonates selected from the class consisting of the following formulae:

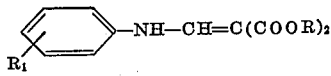

and

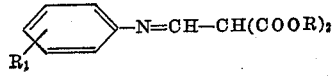

wherein R represents a lower alkyl group, and R₁ represents a member selected from the class consisting of halogen, lower alkyl, lower alkylamino, and lower alkoxy radicals, which comprises heating a mixture of a lower alkyl N-arylformimidate and a lower dialkyl malonate in the presence of a basic catalyst, distilling the reaction mixture to remove unreacted components, and isolating the arylaminoethylenemalonate.

2. The process according to claim 1, wherein the lower dialkylmalonate is dimethylmalonate.

3. The process according to claim 1, wherein the lower dialkylmalonate is diethylmalonate.

4. The process according to claim 1, wherein the lower dialkylmalonate is dipropylmalonate.

5. The process according to claim 1, wherein the lower dialkylmalonate is dibutylmalonate.

SAMUEL A. GLICKMAN.

No references cited.